United States Patent
Lu (10) Patent No.: US 8,689,041 B2
(45) Date of Patent: Apr. 1, 2014

(54) METHOD FOR PROTECTING DATA IN DAMAGED MEMORY CELLS BY DYNAMICALLY SWITCHING MEMORY MODE

(75) Inventor: Ying-Chih Lu, Taipei (TW)

(73) Assignee: Inventec Corporation, Taipei (TW)

( * ) Notice: Subject to any disclaimer, the term of this patent is extended or adjusted under 35 U.S.C. 154(b) by 299 days.

(21) Appl. No.: 13/078,018

(22) Filed: Apr. 1, 2011

(65) Prior Publication Data
US 2012/0137168 A1     May 31, 2012

(30) Foreign Application Priority Data

Nov. 26, 2010   (TW) ................................ 99141044 A (51) Int. Cl.
*G06F 11/00* (2006.01)
(52) U.S. Cl.
USPC ........................................................ 714/6.13
(58) Field of Classification Search
USPC ........................................................ 714/6.13
See application file for complete search history.

(56) References Cited

U.S. PATENT DOCUMENTS

| | | | | |
|---|---|---|---|---|
| 6,249,465 | B1* | 6/2001 | Weiss et al. ................... | 365/200 |
| 8,296,768 | B2* | 10/2012 | Yamada et al. ............... | 718/102 |
| 2004/0243879 | A1* | 12/2004 | Hou et al. ......................... | 714/8 |
| 2009/0063836 | A1* | 3/2009 | Rothman et al. ................. | 713/2 |

OTHER PUBLICATIONS wikipedia, dictionary definition for: "memory cell" http://en.wikipedia.org/wiki/Memory_cell retrieved from on Mar. 20, 2013.*
wikipedia, dictionary definition for: "protected mode" retrieved from http://en.wikipedia.org/wiki/Protected_mode on Mar. 20, 2013.*

\* cited by examiner

*Primary Examiner* — Yair Leibovich
(74) *Attorney, Agent, or Firm* — CKC & Partners Co., Ltd.

(57) ABSTRACT

A method for protecting data in damaged memory cells by dynamically switching memory mode is provided. The method is adapted to an electronic device having a memory, which has a memory controller and at least one memory module, each of which is consisted of a plurality of memory cells, and the memory cells are divided into a plurality of pages. A power-on self test is executed and a mirror memory mode is activated to protect the data in the memory modules. An uncorrectable error of each page of the memory modules is detected by the memory controller when an operating system reads the memory. If the uncorrectable error in one page is detected, the memory module having the page is determined as a damaged memory module, and the mirror memory mode is switched to a spare memory mode, so as to protect the data in the memory modules.

5 Claims, 5 Drawing Sheets

| Memory mode | Memory module 1 | Memory module 2 | Memory module 3 | Memory module 4 |
|---|---|---|---|---|
| Mirror memory mode | Memory address region 1→ served as data module of memory module 3 | Memory address region 2→ served as data module of memory module 4 | Memory address region 1→ served as data module of memory module 1 | Memory address region 2→ served as data module of memory module 2 |

FIG. 5

| Memory mode | Memory module 1 | Memory module 2 | Memory module 3 | Memory module 4 |
|---|---|---|---|---|
| Spare memory mode 1 | Memory address region 1 → uncorrectable error occurs | Memory address region 2 | Memory address region 1 | Memory address region 2 → served as spare module |
| Spare memory mode 2 | Memory address region 1 | Memory address region 2 | Memory address region 1 → uncorrectable error occurs | Memory address region 2 → served as spare module |
| Spare memory mode 3 | Memory address region 1 | Memory address region 2 | Memory address region 1 → served as spare module | Memory address region 2 → uncorrectable error occurs |
| Spare memory mode 4 | Memory address region 1 | Memory address region 2 → uncorrectable error occurs | Memory address region 1 → served as spare module | Memory address region 2 |

FIG. 6

| Memory mode | Memory module 1 | Memory module 2 | Memory module 3 | Memory module 4 |
|---|---|---|---|---|
| Page memory mode 1 | Uncorrectable error occurs | Memory address region 2 → correctable error occurs | Memory address region 1 | Served as a spare module → replace memory module 2 |
| Page memory mode 2 | Uncorrectable error occurs | Memory address region 2 | Memory address region 1 → correctable error occurs | Served as a spare module → replace memory module 3 |
| Page memory mode 3 | Memory address region 1 → correctable error occurs | Memory address region 2 | Uncorrectable error occurs | Served as a spare module → replace memory module 1 |
| Page memory mode 4 | Memory address region 1 | Memory address region 2 → correctable error occurs | Uncorrectable error occurs | Served as a spare module → replace memory module 2 |
| Page memory mode 5 | Memory address region 1 → correctable error occurs | Memory address region 2 | Served as a spare module → replace memory module 1 | Uncorrectable error occurs |
| Page memory mode 6 | Memory address region 1 | Memory address region 2 → correctable error occurs | Served as a spare module → replace memory module 2 | Uncorrectable error occurs |
| Page memory mode 7 | Memory address region 1 → correctable error occurs | Uncorrectable error occurs | Served as a spare module → replace memory module 1 | Memory address region 2 |
| Page memory mode 8 | Memory address region 1 | Uncorrectable error occurs | Served as a spare module → replace memory module 4 | Memory address region 2 → correctable error occurs |

FIG. 7

METHOD FOR PROTECTING DATA IN DAMAGED MEMORY CELLS BY DYNAMICALLY SWITCHING MEMORY MODE

CROSS-REFERENCE TO RELATED APPLICATION

This application claims the priority benefit of Taiwan application serial no. 99141044, filed on Nov. 26, 2010. The entirety of the above-mentioned patent application is hereby incorporated by reference herein and made a part of this specification.

BACKGROUND OF THE INVENTION

1. Field of the Invention

The invention generally relates to a data protection method, and more particularly, to method for protecting data in damaged memory cells by dynamically switching the memory mode.

2. Description of Related Art

Along with the development of electronic technology, storage medium has become a key factor in information exchange, wherein memory has become the most indispensable storage medium for computers thanks to its high operation speed. However, since the requirement to transmission speed has increased with the increasing data transmission capacity, the demand to large-capacity and high-speed memories has increased too.

However, at the same time of increasing the capacity of a memory, the density of memory cells in the memory is also increased. Accordingly, the size of each memory cell has to be reduced when the density of semiconductor memory devices in an integrated circuit (IC) is increased. Thus, the process for fabricating memory cells of reduced size without sacrificing the original capacitance thereof becomes very complicated, and more errors are likely to be produced in such memory cells when the system access speed is high.

Errors produced in a memory may be correctable errors (CEs) or uncorrectable errors (UEs). A CE is usually a single bit error (SBE) or a multi-bit error (MBE) in which the number and position of the error bits are within a correctable range of an electronic device. A CE can be flexibly corrected through an error detection and correction (EDC) technique.

Conventionally, a spare memory module is configured in a memory such that data can be backed up when a CE is detected in the memory. On the other hand, conventionally, half of a memory is configured as a mirror memory, and the mirror memory is used for data correction when an UE is detected in the memory.

However, the prior art statically selects the mirror memory mode or the spare memory mode to protect the data of the memory cells through the menu items of the basis input output system (BIOS) in the beginning of starting up, and then the memory mode is used constantly until the system is restarted. Since each memory mode respectively has its own protection target, i.e. the uncorrectable error or the correctable error, and enough memory capacity is necessary for activating the protection function, once an error occurs during the operations of the system, redundant lost would be generated, such that the function for protecting the memory is failed and good redundant memory pages are wasted.

SUMMARY OF THE INVENTION

The present invention provides a method for protecting data in damaged memory cells by dynamically switching the memory mode, such that the data in the damaged memory cells could be protected by dynamically switching the memory mode when an error of the memory occurs.

The present invention provides a method for protecting data in damaged memory cells by dynamically switching memory mode, adaptable to an electronic device having a memory. The memory comprises a memory controller and at least one memory module. Each of the memory modules is consisted of a plurality of memory cells, and the memory cells are divided into a plurality of pages. A power-on self test is executed and a mirror memory mode is activated to protect the data in the memory modules. Next, an operating system is executed and an uncorrectable error of each page of the memory modules is detected by the memory controller when the operating system reads the memory. If the uncorrectable error in one page is detected, the memory module having the page is determined as a damaged memory module, and the mirror memory mode is switched to a spare memory mode, so as to protect the data in the memory modules.

In an embodiment of the present invention, the step of activating the mirror memory mode to protect the data of the memory modules comprises: finding out at least one data module and at least one corresponding mirror module thereof in the memory modules; and accessing the corresponding mirror modules simultaneously each time the electronic device accesses the data modules through the memory controller.

In an embodiment of the present invention, the step of switching the mirror memory mode to the spare memory mode to protect the data of the memory modules when the uncorrectable error is detected in one of the pages comprises: replacing the damaged memory module with the mirror module corresponded to the damaged memory module to correct the uncorrectable error, and ending the mirror memory mode; and activating the spare memory mode, and using one of the memory modules without of the uncorrectable error as a spare module to correct a correctable error in other memory modules.

In an embodiment of the present invention, after the step of switching the mirror memory mode to the spare memory mode to protect the data of the memory modules, the method further comprises: detecting the correctable error of each of the memory modules without the uncorrectable error by using the memory controller; accumulating a number of times occurring the correctable error of each of the memory modules, and comparing the number with a threshold; when a number of times occurring the correctable error of one of the memory modules is greater than or equal to the threshold, determining that the memory module is a damaged memory module; and switching the spare memory mode to a page memory mode, replacing the damaged memory module with one of other undamaged memory modules, and protecting the correctable error in undamaged memory modules by using at least one undamaged pages of the damaged memory module.

In an embodiment of the present invention, the step of switching the spare memory mode to the page memory mode, replacing the damaged memory module with one of other undamaged memory modules, and protecting the correctable error in undamaged memory modules by using at least one undamaged pages of the damaged memory module comprises: activating the page memory mode, and obtaining one of the undamaged pages from the damaged memory modules as a spare page to backup data of one damaged page having the correctable error in the undamaged memory modules; recording a mapping address of the damaged page and the spare page into a page mapping table in the memory controller; and switching to access the data of the spare page by the memory controller according to the mapping address in the page mapping table when the operating system accesses the damaged page.

The present invention provides a method for protecting data in damaged memory cells by dynamically switching memory mode, adaptable to an electronic device having a memory. The memory comprises a memory controller and at least one memory module. Each of the memory modules is consisted of a plurality of memory cells, and the memory cells are divided into a plurality of pages. The method comprises: executing a power-on self-test (POST), and activating a mirror memory mode to protect the data of the memory modules; executing an operating system, and detecting an correctable error of each of the memory modules by using the memory controller when the operating system reads the memory; accumulating a number of times occurring the correctable error of each of the memory modules, and comparing the number with a threshold; when the number of times occurring the correctable error of one of the memory modules is greater than or equal to the threshold, determining that the memory module is the damaged memory module; and switching the spare memory mode to a page memory mode to protect the data of the memory modules.

In an embodiment of the present invention, after detecting the correctable error of each of the memory modules by using the memory controller, the method further comprises: finding out a spare module in the memory modules; and using the spare module to backup the data of the memory module having the correctable error to correct the correctable error in the memory module.

In an embodiment of the present invention, the step of switching the spare memory mode to the page memory mode to protect the data of the memory modules comprises: activating the page memory mode, and obtaining one of the undamaged pages from the damaged memory modules as a spare page to backup data of one damaged page having the correctable error in the undamaged memory modules; recording a mapping address of the damaged page and the spare page into a page mapping table in the memory controller; and when the operating system accesses the damaged page, switching to access the data of the spare page by the memory controller according to the mapping address in the page mapping table.

In an embodiment of the present invention, when activating the mirror memory mode, the spare memory mode or the page memory mode, the method further comprises transmitting an IPMI command to a board management controller to notify the board management controller memory mode which memory mode is currently used.

In light of the foregoing descriptions, the method for protecting data in damaged memory cells by dynamically switching memory mode switches the mirror memory mode to the spare memory mode if an uncorrectable error occurs during reading the memory. If the number of times occurring correctable errors in a single page is greater than a predetermined quantity, the spare memory mode is switched back to the mirror memory mode, such that the data of the memory cells is protected.

In order to make the aforementioned and other features and advantages of the invention more comprehensible, embodiments accompanying figures are described in detail below.

BRIEF DESCRIPTION OF THE DRAWINGS

The accompanying drawings constituting a part of this specification are incorporated herein to provide a further understanding of the invention. Here, the drawings illustrate embodiments of the invention and, together with the description, serve to explain the principles of the invention.

DESCRIPTION OF EMBODIMENTS

Current mirror memory mode backups each of memory modules of a memory by using a mirror module having the same capacity. When an uncorrectable error (UE) occurs in one of the memory modules, the memory module is replaced by the corresponding mirror module for reading operations of an operating system. However, in such time, the mirror protection function of the memory would be invalid. Accordingly, the present invention dynamically switches the memory mode to the spare memory mode to use the rest uninfluenced memory modules, so as to protect the data of the memory modules having the correctable error (CE). Therefore, the function of protecting memory data could be continuously provided. The present invention provides a method for protecting the data in damaged memory cells, which is developed from the above-mentioned concept. Some embodiments are enumerated for more detailed description below.

Figure 1:
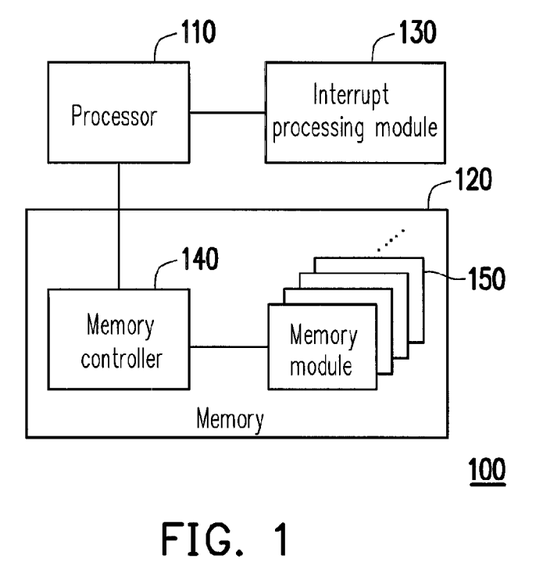
FIG. 1 is a schematic view of an electronic device according to an embodiment of the invention.

FIG. 1 is a schematic view of an electronic device according to an embodiment of the invention. Referring to FIG. 1, in the embodiment, the electronic device 100 has a processor 110, a memory 120, and an interrupt processing module 130. The memory 120 has a memory controller 140 and at least one memory module 150. Each of the memory modules 150 is consisted of a plurality of memory cells, and the memory cells are divided into a plurality of pages.

The processor 110 is a central processing unit (CPU), for example. The memory 120 is, for example, a dynamic random access memory (DRAM) or other kind memory. In addition, the interrupt processing module 130 is, for example, a system management interrupt (SMI) handler, which is used to serve the system management interrupts (SMIs) received by the processor 110.

In detail, when the elements in the electronic device 100 trigger the SMI, the SMI are transmitted to the processor 110. When receiving the SMI, the processor 110 enters a system management mode (SMM), such that a basic input output system (BIOS) executes the SMI in such mode to serve the SMI.

Figure 2:
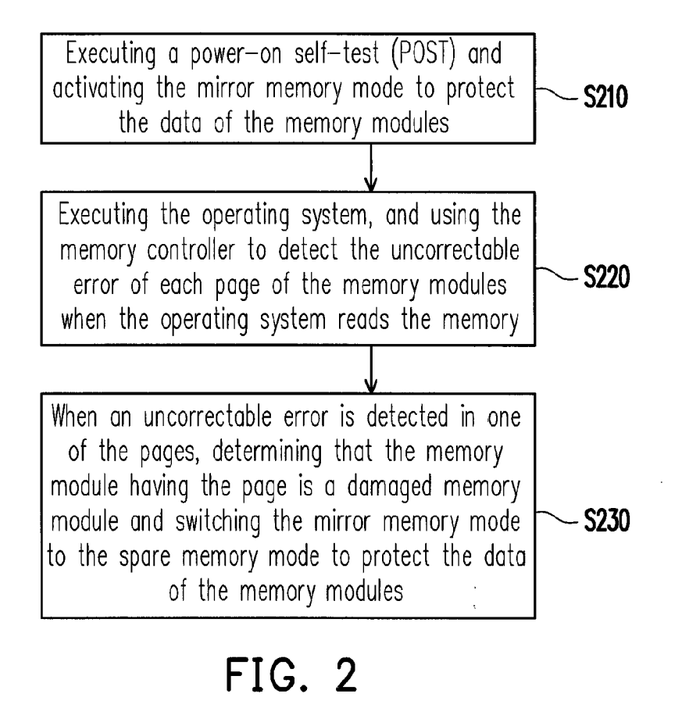
FIG. 2 is a flowchart illustrating a method for protecting data in damaged memory cells by dynamically switching memory mode according to an embodiment of the present invention.

FIG. 2 is a flowchart illustrating a method for protecting data in damaged memory cells by dynamically switching memory mode according to an embodiment of the present invention. Referring to FIG. 2, the method of the embodiment is adapted to the electronic device 100 in FIG. 1. The method is further described below with reference to each element of the electronic device 100 in FIG. 1.

When the electronic device 100 is turned on, the processor 110 executes a power-on self-test (POST) and actives the mirror memory mode to protect the data of the memory modules 150 (step S210). When the electronic device 100 is turned on, the electronic device 100 would, for example, check the installation state of the memory 120 to find out the memory mode used by the memory 120. After activating the memory mode, the electronic device 100 transmits an IPMI command to a board management controller (BMC) to notify the board management controller which memory mode is currently used. In the embodiment, the electronic device 100 is preset to use the mirror memory mode to protect the data of the memory 120.

In the mirror memory mode, the electronic device 100, for example, finds out at least a data module and mirror modules corresponding to the data modules for storing data in the memory modules 150. Each time the electronic device 100 accesses the data modules through the memory controller 140, the electronic device 100 accesses the corresponding mirror modules simultaneously. Accordingly, once the data of any data module or mirror module can not be read due to the uncorrectable error, the electronic device 100 still can find out the data by using the corresponding data modules or the mirror modules.

Then, the processor 100 executes the operating system. When the operating system reads the memory, the memory controller 140 is used to detect the uncorrectable error of each page of the memory modules 150 (step S220). The uncorrectable error includes a multi-bit error (MBE) in which the number and position of the error bits are without a correctable range of the electronic device, but the present invention is not limited thereto.

When the memory controller 140 detects the uncorrectable error in one of the pages, the memory controller 140 determines that the memory module 150 having the page is a damaged memory module and switches the mirror memory mode to a spare memory mode to protect the data of the memory modules 150 (step S230). In detail, when the memory controller 140 detects the uncorrectable error, the memory controller 140 transmits the SMI to the processor 110. The processor 110 enters the SMM while receiving the SMI so as to notify the interrupt processing module 130 to execute a system interrupt. Meanwhile, the interrupt processing module 130 uses the mirror modules corresponding to the damaged memory modules to replace the damaged memory modules to correct the uncorrectable error. Then, the interrupt processing module 130 ends the mirror memory mode and activates the backup memory module to use one of the memory modules 150 without the uncorrectable error as a spare module to correct the correctable errors in other memory modules 150. After activating the spare memory mode, the interrupt processing module 130 transmits an IPMI command to the board management controller to notify the board management controller that a mirror redundancy lost has occurred and it has been switched to the spare memory mode. Then, the interrupt processing module 130 is exited.

According to the foregoing method for protecting data, the electronic device can continue using the rest memory modules to prevent correctable errors when the preset memory mode is the mirror memory mode and the uncorrectable error has occurred, such that the redundant lost of the memory would not occur and the function for protecting data of the memory is kept.

It should be noted that, when the memory mode is switched to the spare memory mode, the method of the present invention keeps detecting the correctable errors of each of the memory modules, replacing the one of the memory modules whenever a number of times that the correctable error occurs in a single page is greater than a predetermined quantity, and switching the memory mode to the page memory mode to continue protecting the data of the rest memory modules. Another embodiment is illustrated in the following.

Figure 3:
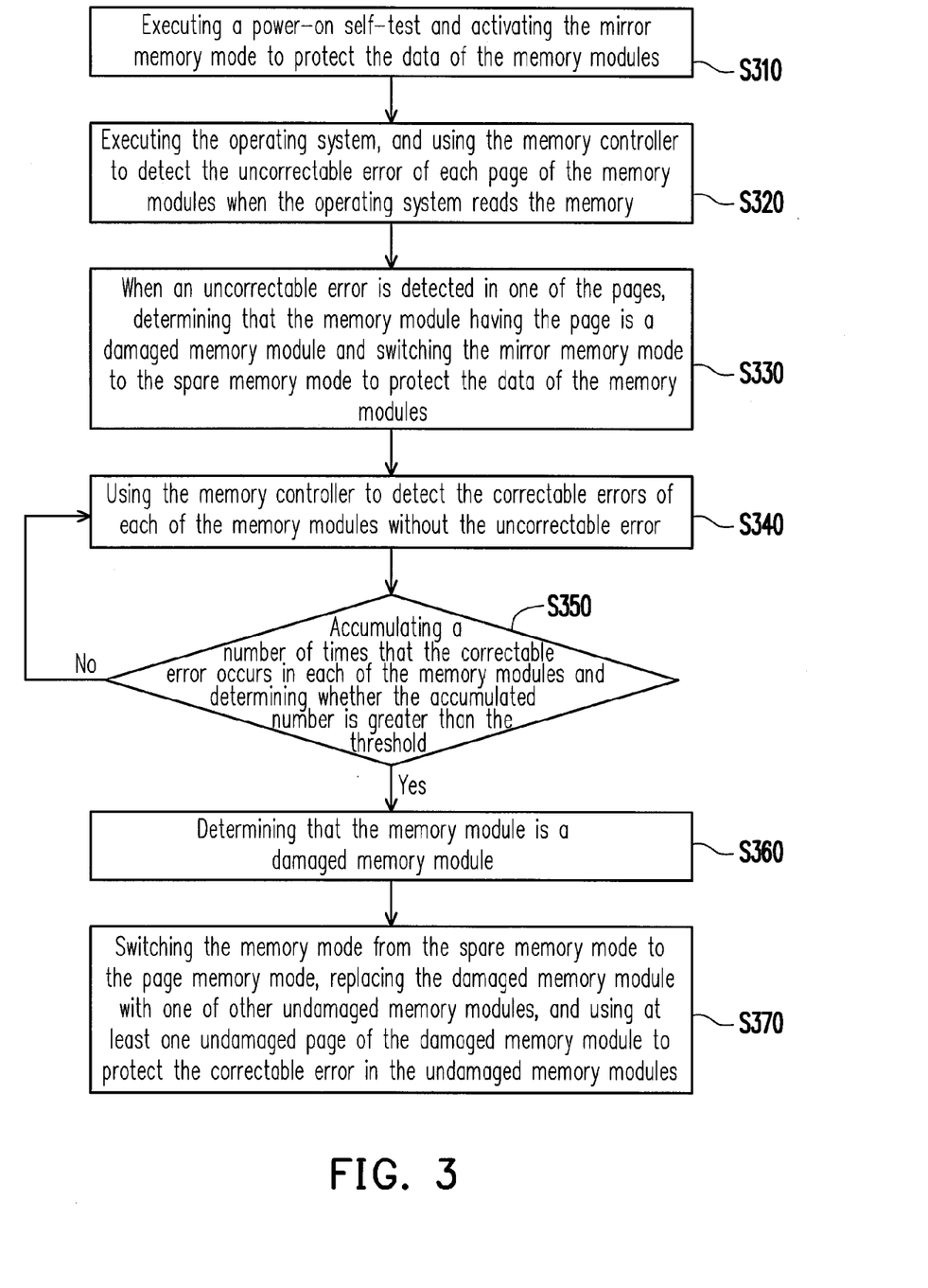
FIG. 3 is a flowchart illustrating a method for protecting data in damaged memory cells by dynamically switching memory mode according to an embodiment of the present invention.

FIG. 3 is a flowchart illustrating a method for protecting data in damaged memory cells by dynamically switching memory mode according to an embodiment of the present invention. Referring to FIG. 3, the method of the embodiment is adapted to the electronic device 100 in FIG. 1. The steps of the method will be described in detail with the elements of the electronic device 100 in FIG. 1 as follows.

When the electronic device 100 is turned on, the processor 110 executes a power-on self-test (POST) and actives the mirror memory mode to protect the data of the memory modules 150 (step S310). Then, the processor 100 executes the operating system. When the operating system reads the memory, the memory controller 140 is used to detect the uncorrectable error of each page of the memory modules 150 (step S320). When the memory controller 140 detects the uncorrectable error in one of the pages, the memory controller 140 determines that the memory module 150 having the page is a damaged memory module and switches the mirror memory mode to a spare memory mode to protect the data of the memory modules 150 (step S330). The detailed content of the above steps S310-S330 are all identical or similar to the steps S210-S230 in the above embodiment, and will not be described herein.

The difference between the previous embodiment and the present embodiment is that the electronic device 100 of the present embodiment continues using the memory controller 140 to detect the correctable errors of each of the memory modules 150 without the uncorrectable error when the electronic device 100 uses the spare memory mode to protect the memory data (step S340). When the memory controller 140 detects the correctable error, the memory controller 140 transmits a system interrupt to execute the interrupt processing module 130. The interrupt processing module 130 recognizes which page has the correctable error by reading, for example, an error page register of the memory controller 140.

Then, the interrupt processing module 130 accumulates a number of times that the correctable error occurs in each of the memory modules 150 and compares the number with a threshold to determine whether the accumulated number is greater than the threshold (step S350). The threshold is, for example, a predetermined value or a value preset by the user. In detail, when turning on the electronic 100, a setting interface may be displayed on the startup screen of the BIOS, for example, to allow the user to set the value of the threshold.

When the interrupt processing module 130 determines that the number of times that the correctable error occurs in one of the memory modules 150 is greater than or equal to the threshold, the interrupt processing module 130 determines that the memory module 150 is a damaged memory module (step S360); otherwise, the process goes back to step S340 to continue detecting the correctable error of each of the memory modules 150. Then, the interrupt processing module 130 switches the memory mode from the spare memory mode to the page memory mode, replaces the damaged memory module with one of other undamaged memory modules 150, and uses at least one undamaged page of the damaged memory module 150 to protect the correctable error in the undamaged memory modules 150 (step S370).

The interrupt processing module 130 ends the spare memory mode, activates the page memory mode, and obtains one of the undamaged pages from the damaged memory modules 150 as a backup page to backup data of one damaged page that the correctable error occurs in the undamaged memory modules 150. After activating the page memory mode, the interrupt management module 130 transmits an IPMI command to the board management controller to notify the board management controller that a spare redundancy lost has occurred and it has been switched to the page memory mode. Then, the interrupt management module 130 is exited.

In detail, in the page memory mode, the processor 110 of the electronic device 100 continues executing the operating system, and when the operating system reads the memory 120, the processor 120 detects and corrects the correctable error of each page of the memory modules 150 through the memory controller 140. The processor 110 enables, for example, an error page register in the memory 120 to enable the function of system interrupt capable of correcting errors. When the memory controller 140 detects the correctable error, the memory controller 140 records the page address, where the correctable error occurs, into the error page register and transmits a system interrupt to execute the interrupt processing module 130. The interrupt processing module 130 also recognizes which page has the correctable error by reading the pages having the correctable error recorded in the error page register.

Then, the interrupt processing module 130 accumulates the number of times that the correctable error occurs in each page and compares the number with a threshold to determine whether the accumulated number is greater than the threshold. When the interrupt processing module 130 determines that the number of times that the correctable error occurs in one of the pages is greater than the threshold, the interrupt processing module 130 determines that the page is a damaged page and obtains one of the undamaged page from the damaged memory modules 150 as a spare page to backup data of the damaged page.

After finishing backing up the data, the interrupt processing module 130 records a mapping address of the damaged page and the spare page into a page mapping table in the memory controller 140. The interrupt processing module 130 uses, for example, a method of memory address remapping to map the address of the damaged page to the address of the spare page and insert the addresses of damaged page and the spare page respectively into empty columns of the page mapping table.

Accordingly, next time when the operating system accesses the damaged page, the memory controller 140 is switched to access the data of the spare page according to the mapping address in the page mapping table, such that the data of damaged memory cells are protected. According to the method of memory address remapping, when the operating system accesses the original address of the damaged page, the operating system finally accesses the mapping address of the spare page through the remapping of the memory controller 140. For this reason, in the embodiment, it is not necessary to modify the programs of the operating system.

It should be noted that, when obtaining the undamaged page, if the interrupt processing module 130 recognizes that the undamaged pages in the memory modules 150 is going to be exhausted or have been exhausted, the interrupt processing module 130 transmits an IPMI command to the board management controller to notify the board management controller that a page redundancy lost has occurred and there is no memory protection. Accordingly, the user of the electronic device 100 is notified to replace the memory modules 150 immediately.

According to the foregoing method for protecting data, the electronic device can continue using the undamaged pages in the damaged memory module to correct the correctable error when the preset memory mode is the mirror memory mode, and the uncorrectable error and the correctable error have occurred, such that the redundant lost of the memory would not be occurred and the function for protecting data of the memory is kept.

It should be noted that, in the above embodiments, the memory mode when the electronic device is starting up is preset to be the mirror memory mode, and the memory mode is dynamically switched to the spare memory mode or the page memory mode when errors occur. In another embodiment of the present invention, the preset memory mode when stating up the electronic device could be the spare memory mode, and the memory mode could be dynamically switched to the page memory mode to continue protecting the memory data. Another embodiment is illustrated in the following.

Figure 4:
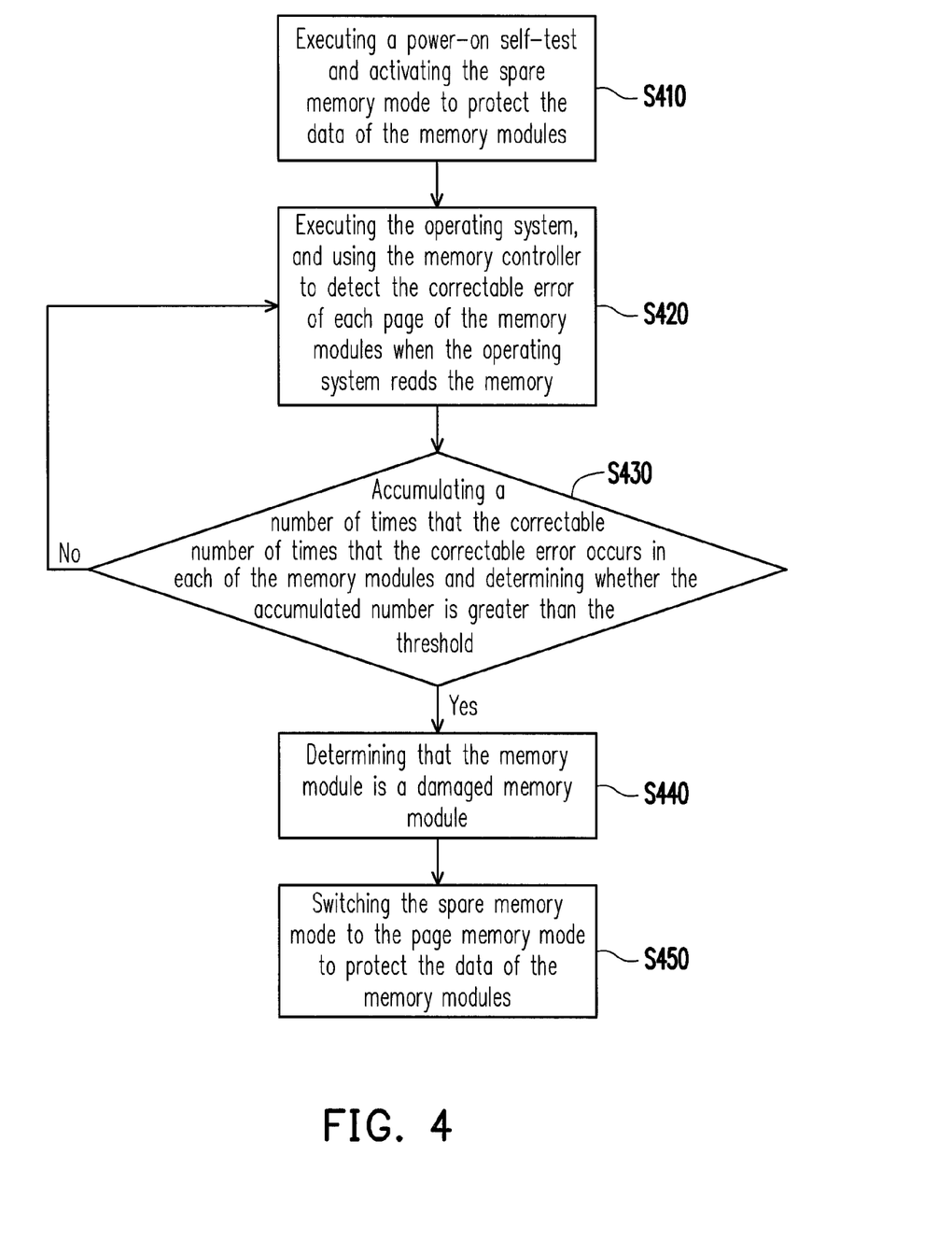
FIG. 4 is a flowchart illustrating a method for protecting data in damaged memory cells by dynamically switching memory mode according to an embodiment of the present invention.

FIG. 4 is a flowchart illustrating a method for protecting data in damaged memory cells by dynamically switching memory mode according to an embodiment of the present invention. Referring to FIG. 4, the method of the embodiment is adapted to the electronic device 100 in FIG. 1. The steps of the method will be described in detail with the elements of the electronic device 100 in FIG. 1 as follows.

When the electronic device 100 is turned on, the processor 110 executes the power-on self-test and actives the spare memory mode to protect the data of the memory modules 150 (step S410). When the electronic device 100 is turned on, the electronic device 100 would, for example, check the installation state of the memory 120 to find out the memory mode used by the memory 120. In the embodiment, the electronic device 100 is preset to use the spare memory mode to protect the data of the memory 120.

In the spare memory mode, the electronic device 100 finds out, for example, a spare module, which is used to backup data, in the memory modules 150, so as to correct the correctable error of the memory module 150 by backing up the data of the memory module 150.

Then, the processor 100 executes the operating system. When the operating system reads the memory, the memory controller 140 is used to detect the correctable error in the memory modules 150 (step S420). When the memory controller 140 detects the correctable error, the memory controller 140 transmits a system interrupt to execute the interrupt processing module 130. The interrupt processing module 130 recognizes which page has the correctable error by reading, for example, an error page register of the memory controller 140.

Then, the interrupt processing module 130 accumulates a number of times that the correctable error occurs in each of the memory modules 150 and compares the number with a threshold to determine whether the accumulated number is greater than the threshold (step S430). The threshold is, for example, a predetermined value or a value preset by the user. In detail, when turning on the electronic 100, a setting interface may be displayed on the startup screen of the BIOS, for example, to allow the user to set the value of the threshold.

When the interrupt processing module 130 determines that the number of times that the correctable error occurs in one of the memory modules 150 is greater than or equal to the threshold, the interrupt processing module 130 determines that the memory module 150 is the damaged memory module (step S440); otherwise, the process goes back to step S420 to continue detecting the correctable error in the memory modules 150. Next, the interrupt processing module 130 switches the memory mode from the spare memory mode to the page memory mode so as to protect the data of the memory modules 150 (step S450). In detail, the interrupt processing module 130, for example, ends the spare memory mode, activates the page memory mode, obtains one of the undamaged page from the damaged memory modules 150 as a spare page to backup data of a damaged page having the correctable error in the undamaged memory modules 150, and records the mapping address of the damaged page and the spare page into the mapping table in the memory controller 140. When the operating system accesses the damaged page, the memory controller is switched to access the data of the spare page according to the mapping address in the page mapping table. After activating the spare memory mode, the interrupt management module 130 transmits an IPMI command to the board management controller to notify the board management controller that a spare redundancy lost has occurred and it has been switched to the page memory mode. Then, the interrupt management module 130 is exited.

According to the foregoing method for protecting data, the electronic device can continue using the undamaged pages in the damaged memory module to correct the correctable error when the preset memory mode is the spare memory mode and the correctable error has occurred, such that the redundant lost of the memory would not occur and the function for protecting data of the memory is kept.

In order to clarify the foregoing embodiment, a memory having four memory modules is taken as an example to describe the detail process for protecting the data of the damaged memory cells by dynamically switching the memory mode in the present invention.

Figure 5:
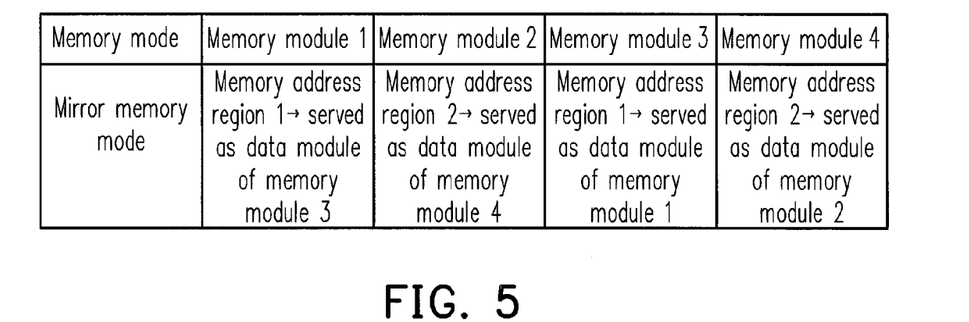
FIG. 5 is an example of the usage of the memory modules under the mirror memory mode according to an embodiment of the present invention.
Figure 6:
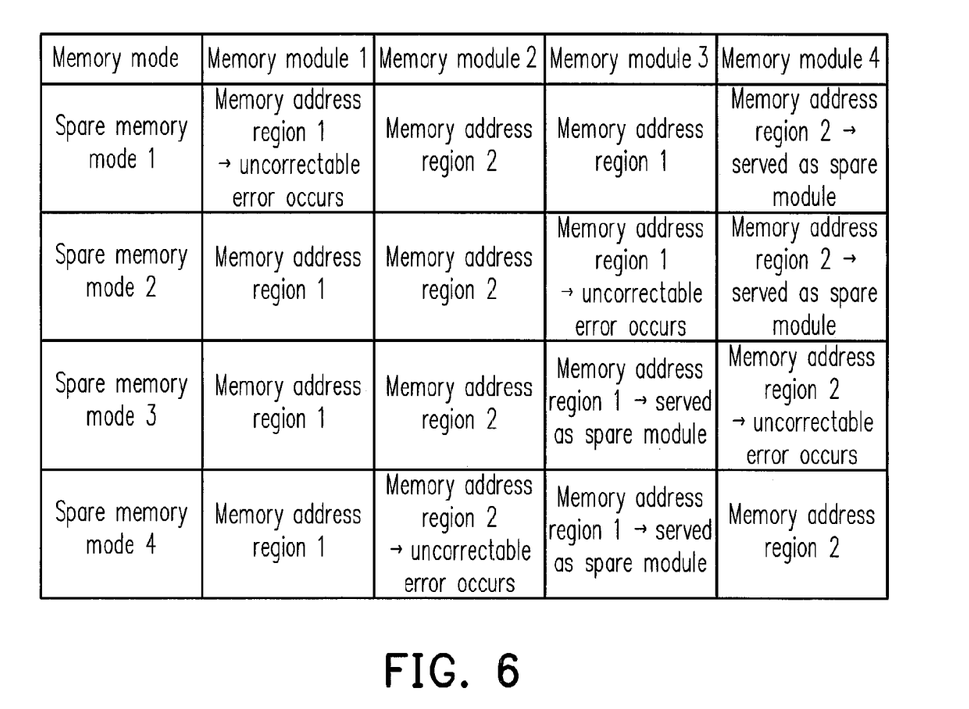
FIG. 6 is an example of the usage of the memory modules under the spare memory mode according to an embodiment of the present invention.
Figure 7:
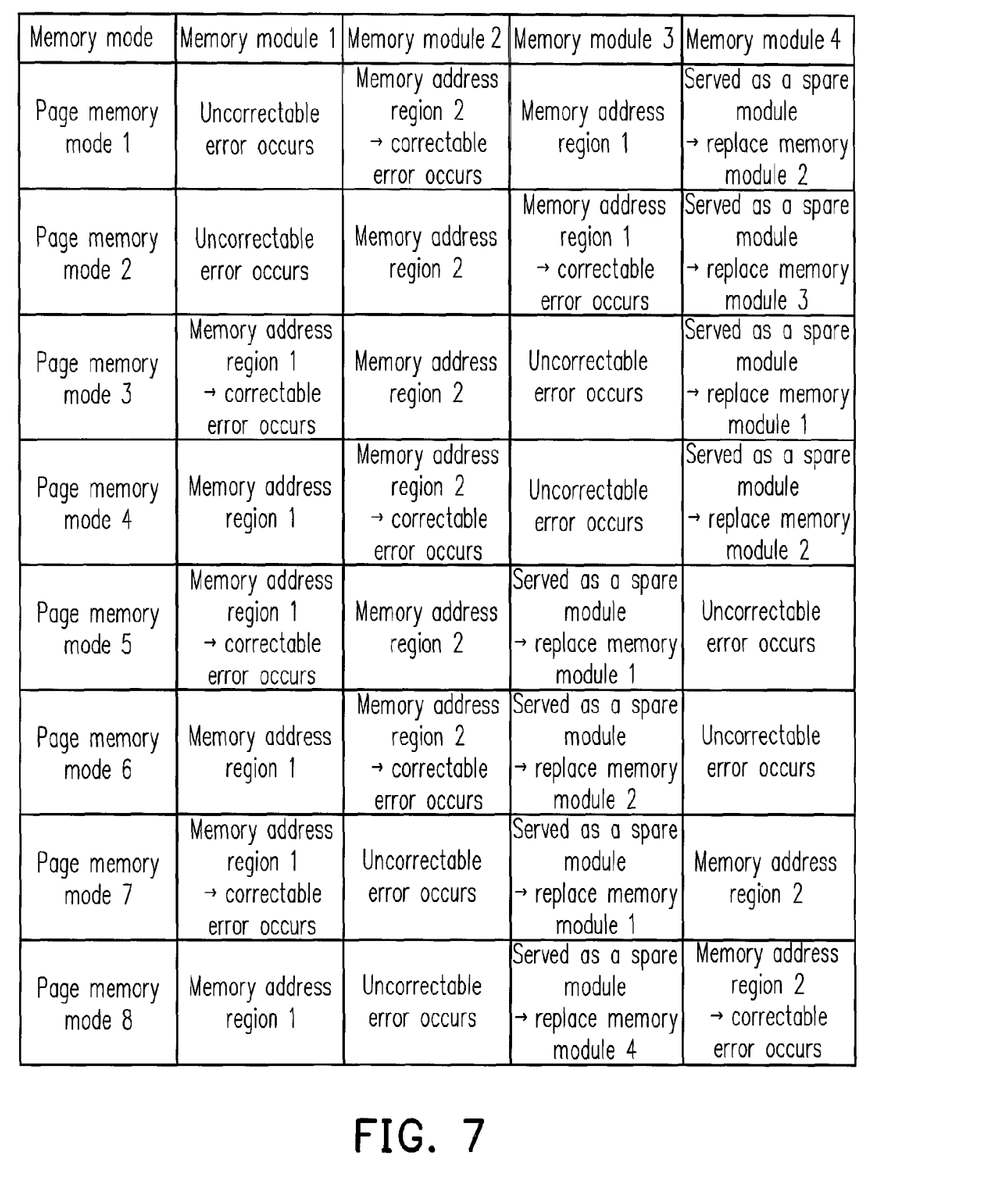
FIG. 7 is an example of the usage of the memory modules under the page memory mode according to an embodiment of the present invention.

FIGS. 5-7 are examples of the usage of the memory modules under the mirror memory mode, spare memory mode and page memory mode respectively according to an embodiment of the present invention. In the embodiment, it is assumed that the memory of the electronic device has the memory modules 1, 2, 3 and 4 and the present memory mode of the electronic device is the mirror memory mode.

First, referring to FIG. 5, in the mirror memory mode, the memory modules 1 and 2 are used as data modules for storing data, and the memory modules 3 and 4 are used as mirror modules of the memory modules 1 and 2, which are adapted to protect the data stored in the memory modules 1 and 2. In detail, each time the electronic device writes data into the memory modules 1 and 2 through the memory controller, the data is also written into the memory modules 3 and 4 to prevent the memory modules 1 and 2 from the uncorrectable error.

Then, referring to FIG. 6, in the spare memory mode, if any one of the memory modules 1-4 has the uncorrectable error, the electronic device switches the memory mode to the spare memory mode. In addition, the electronic device stops using the memory module having the uncorrectable error, and replaces the memory module with the corresponding mirror module thereof. Moreover, the electronic device selects one of the rest memory modules as the spare module to correct the correctable error in the rest memory modules. For example, in the spare memory mode 1, the uncorrectable error occurs in the memory module 1. At such time, the electronic device stops using the memory module 1 and replaces the memory module 1 with the corresponding mirror module thereof (i.e. the memory module 3). Moreover, the electronic device selects the memory module 4 as the spare module to correct the correctable errors in the memory modules 2 and 3. Likewise, the results of the spare memory modes 1-4 shown in FIG. 6 could be obtained accordingly.

Finally, referring to FIG. 7, in the spare memory mode, if any one of the memory modules 1-4 has the uncorrectable error and the number of times that the correctable error occurs is greater than the threshold, the electronic device switches the memory mode to the page memory mode. In addition, the electronic device stops using the memory module having the uncorrectable error, and replaces the memory module with the corresponding spare module in the spare mode. Moreover, the electronic device further selects an undamaged page from the damaged memory module as the spare page to correct the correctable error in the undamaged memory modules. For example, in the page memory mode 1, the uncorrectable error occurs in the memory module 1, and the number of times that the correctable error occurs in the memory module 2 is greater than the threshold. At such time, the electronic device backups the data of the memory module 2 by using the spare module (i.e. the memory module 4) and replaces the memory module 2 with the spare module. Moreover, the electronic device further uses the undamaged pages in the damaged memory modules (i.e. the memory modules 1 and 2) as the spare pages to correct the correctable error in the undamaged memory modules (i.e. the memory modules 3 and 4). Likewise, the results of the page memory modes 1-8 shown in FIG. 7 could be obtained accordingly.

In light of the foregoing descriptions, the method for protecting data in damaged memory cells by dynamically switching memory mode of the present invention constantly detects and corrects the correctable error and the uncorrectable error when the electronic device is operating. The memory mode is appropriately switched from the mirror mode to the spare memory mode or from the spare memory mode to the page memory mode. Accordingly, the function of the electronic device for protecting data of the memory is kept, and the undamaged memory capacity in the memory could be used effectively.

Although the invention has been described with reference to the above embodiments, it will be apparent to one of the ordinary skill in the art that modifications to the described embodiment may be made without departing from the spirit of the invention. Accordingly, the scope of the invention will be defined by the attached claims not by the above detailed descriptions.

What is claimed is:

1. A method for protecting data in damaged memory cells by dynamically switching memory mode, adaptable to an electronic device having a memory, wherein the memory comprises a memory controller and at least one memory module, each of the at least one memory module is consisted of a plurality of memory cells, and the memory cells are divided into a plurality of pages, the method comprising:

executing a power-on self-test (POST), and activating a mirror memory mode to protect data of the at least one memory module;

executing an operating system and detecting an uncorrectable error occurred in each of the pages of the at least one memory module by using the memory controller when the operating system reads the memory, when the uncorrectable error is detected in one of the pages, determining that the memory module having the page is a damaged memory module, and switching the mirror memory mode to a spare memory mode to protect the data of the at least one memory module;

detecting a correctable error of each of the at least one memory module without the uncorrectable error by using the memory controller;

accumulating a number of times occurring the correctable error of each of the at least one memory module, and comparing the number with a threshold;

when the number of times occurring the correctable error of one of the at least one memory module is greater than or equal to the threshold, determining that the memory module is a damaged memory module;

switching the spare memory mode to a page memory mode, replacing the damaged memory module with one of other undamaged memory modules, and protecting the correctable error in undamaged memory modules by using at least one undamaged page of the damaged memory module, wherein when activating the mirror memory mode, the spare memory mode or the page memory mode, further comprises:

transmitting an IPMI command to a board management controller to notify the board management controller memory mode which memory mode is currently used.

2. The method for protecting data in damaged memory cells by dynamically switching memory mode as claimed in claim 1, wherein the step of activating the mirror memory mode to protect the data of the at least one memory module comprises:

finding out at least one data module and at least one corresponding mirror module thereof in the at least one memory module; and each time the electronic device accesses one of the at least one data module through the memory controller, accessing the corresponding one of the mirror modules simultaneously.

3. The method for protecting data in damaged memory cells by dynamically switching memory mode as claimed in claim 2, wherein the step of switching the mirror memory mode to the spare memory mode to protect the data of the at least one memory module when the uncorrectable error is detected in one of the pages comprises;

replacing the damaged memory module with the mirror module corresponded to the damaged memory module to correct the uncorrectable error, and ending the mirror memory mode; and activating the spare memory mode, and using one of the at least one memory module without the uncorrectable error as a spare module to correct the correctable error in other memory modules.

4. The method for protecting data in damaged memory cells by dynamically switching memory mode as claimed in claim 1, wherein the step of switching the spare memory mode to the page memory mode, replacing the damaged memory module with one of other undamaged memory modules, and protecting the correctable error in undamaged memory modules by using at least one undamaged page of the damaged memory module comprises:

activating the page memory mode, and obtaining one of the at least one undamaged page from the damaged memory modules as a spare page to backup data of one damaged page having the correctable error in the undamaged memory modules;

recording a mapping address of the damaged page and the spare page into a page mapping table in the memory controller; and the memory controller being switched to access the data of the spare page according to the mapping address in the page mapping table when the operating system accesses the damaged page.

5. A method for protecting data in damaged memory cells by dynamically switching memory mode, adaptable to an electronic device having a memory, wherein the memory comprises a memory controller and at least one memory module, each of the at least one memory module is consisted of a plurality of memory cells, and the memory cells are divided into a plurality of pages, the method comprising:

executing a power-on self-test (POST), and activating a mirror memory mode to protect the data of the at least one memory module;

executing an operating system, and detecting a correctable error occurred in each of the at least one memory module by using the memory controller when the operating system reads the memory; wherein after detecting the correctable error occurred in each of the at least one memory module by using the memory controller, the method further comprises:

finding out a spare module in the at least one memory module; and using the spare module to backup the data of the memory module having the correctable error to correct the correctable error in the memory module;

accumulating a number of times occurring the correctable error of each of the at least one memory module, and comparing the number with a threshold;

when the number of times occurring the correctable error of one of the at least one memory module is greater than or equal to the threshold, determining that the memory module is the damaged memory module; and switching a spare memory mode to a page memory mode to protect the data of the at least one memory module, wherein the switching further comprises:

activating the page memory mode, and obtaining one of at least one undamaged pages from the damaged memory modules as a spare page to backup data of a damaged page having the correctable error in the undamaged memory modules;

recording a mapping address of the damaged page and the spare page into a page mapping table in the memory controller; and when the operating system accesses the damaged page, the memory controller being switched to access the data of the spare page according to the mapping address in the page mapping table;

wherein activating the spare memory mode or the page memory mode, further comprises:

transmitting an IPMI command to a board management controller to notify the board management controller memory mode which memory mode is currently used.

* * * * *